US006900270B2

(12) United States Patent
Ohrbom et al.

(10) Patent No.: US 6,900,270 B2
(45) Date of Patent: May 31, 2005

(54) CURABLE COATING COMPOSITIONS WITH CARBAMATE COMPOUNDS

(75) Inventors: Walter H. Ohrbom, Hartland Township, MI (US); Craig S. Schang, Madison Heights, MI (US)

(73) Assignee: BASF Corporation, Southfield, MI (US)

( * ) Notice: Subject to any disclaimer, the term of this patent is extended or adjusted under 35 U.S.C. 154(b) by 79 days.

(21) Appl. No.: 10/285,600

(22) Filed: Oct. 31, 2002

(65) Prior Publication Data

US 2004/0087737 A1 May 6, 2004

(51) Int. Cl.$^7$ ................................................ C08F 8/32
(52) U.S. Cl. .................... 525/157; 525/242; 525/481; 525/162; 525/452; 428/418; 428/447
(58) Field of Search ................. 525/157, 242, 525/481, 162, 452; 428/418, 447

(56) References Cited

U.S. PATENT DOCUMENTS

| | | | |
|---|---|---|---|
| 2,979,514 A | 4/1961 | O'Brien .................... 260/340.2 |
| 4,301,257 A | 11/1981 | Zengel et al. ................ 525/329 |
| 4,710,542 A | 12/1987 | Forgione et al. ............. 525/127 |
| 4,758,632 A | 7/1988 | Parekh et al. ................ 525/383 |
| 4,939,213 A | 7/1990 | Jacobs, III et al. ....... 525/329.9 |
| 5,084,541 A | 1/1992 | Jacobs, III et al. ............ 528/45 |
| 5,288,865 A | 2/1994 | Gupta ......................... 544/200 |
| 5,356,669 A | 10/1994 | Rehfuss et al. ........... 427/407.1 |
| 5,373,069 A | 12/1994 | Rehfuss et al. .............. 525/456 |
| 5,474,811 A | 12/1995 | Rehfuss et al. ........... 427/407.1 |
| 5,512,639 A | 4/1996 | Rehfuss et al. .............. 525/456 |
| 5,552,497 A | 9/1996 | Taylor et al. ................ 525/456 |
| 5,605,965 A | 2/1997 | Rehfuss et al. .............. 525/100 |
| 5,719,237 A * | 2/1998 | Rehfuss et al. .............. 525/419 |
| 5,907,024 A * | 5/1999 | Ohrbom et al. ................ 528/75 |
| 5,945,499 A | 8/1999 | Ohrbom et al. ................ 528/75 |
| 5,964,928 A * | 10/1999 | Tomlinson ................ 106/14.21 |
| 5,976,615 A * | 11/1999 | Menovcik et al. ........... 427/140 |
| 5,994,479 A * | 11/1999 | Green et al. ................. 525/481 |
| 6,262,297 B1 | 7/2001 | Clements et al. ............ 560/157 |
| 6,303,690 B1 * | 10/2001 | December et al. ........... 525/163 |
| 6,362,285 B1 | 3/2002 | Ohrbom et al. ........... 525/330.5 |
| 6,376,607 B1 * | 4/2002 | Ambrose et al. ............ 525/101 |
| 6,391,968 B1 * | 5/2002 | Ohrbom et al. ............. 525/162 |
| 6,580,001 B1 | 6/2003 | Bowman et al. ............. 558/260 |
| 2002/0123545 A1 | 9/2002 | Yajking et al. .............. 524/196 |
| 2002/0147279 A1 * | 10/2002 | Ohrbom et al. ............. 525/157 |
| 2003/0100682 A1 * | 5/2003 | Ohrbom et al. ............. 525/242 |
| 2003/0165688 A1 * | 9/2003 | Desai et al. ................. 428/418 |

FOREIGN PATENT DOCUMENTS

| | | | |
|---|---|---|---|
| DE | 1063146 | 7/1958 | |
| DE | 1063146 * | 8/1959 | |
| DE | 1593331 * | 10/1966 | |
| DE | 44 32 897 | 3/1996 | ........... C08L/61/20 |
| EP | 245 700 | 4/1987 | ......... C07D/251/54 |
| EP | 594 068 | 10/1993 | ......... C09D/201/02 |
| EP | 594 071 | 10/1993 | ......... C09D/201/02 |
| EP | 594 142 | 10/1993 | ........... C08L/57/12 |
| EP | 604 922 | 12/1993 | ......... C08K/5/3492 |
| EP | 850 986 | 12/1997 | ......... C08K/5/3492 |
| GB | 843331 | 8/1960 | |
| GB | 1068650 | 12/1965 | |
| GB | 1068650 * | 5/1967 | |
| WO | WO94/10211 | 5/1994 | ............. C08F/8/30 |
| WO | WO94/10212 | 5/1994 | ............. C08F/8/30 |
| WO | WO94/10213 | 5/1994 | ............. C08F/8/30 |
| WO | WO 01/56978 | 8/2001 | ........... C08K/5/205 |

OTHER PUBLICATIONS

English Abstract for JP 05138614, entitled "Persistent Preservative for Timber" Michihiko, et al., Date of Publication Aug. 6, 1993.
English Abstract for JP 2002242075, entitled "Mildew-–proof base fabric for night cover for refrigerator–freezer", date of publication Aug. 28, 2002.
English Abstract of JP 63301251, entitled "Coating composition" Shuichi, et al., date of Publicaiton Dec. 8, 1998.
English Abstract for JP 05229973, entitled "Comprises adol condensation–dehydration of PrCHO in presence of aq. Alk. Soln. Catalyst, removal", et al., Date of Publication Sep. 7, 1993.
Leon Palfray, et al., Compt. Rend. (1941) vol. 212, pp. 911 to 913 AN 1943:29287 Caplus.
Database CA, onlinel, Chemical Abstract Service, Database Accession No. 128:2060676 CA, 1998, XP002265958.
Walter H. Ohrbom, et al. U.S. Appl. No. 10/285,634, filed Oct. 31, 2002, pp. 1–41 and abstract.

(Continued)

*Primary Examiner*—David W. Wu
*Assistant Examiner*—Henry S. Hu

(57) ABSTRACT

Provided is a curable coating composition comprising a reactive compound having one or more structures of the formula:

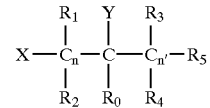

wherein X is a primary carbamate group, Y is a hydroxy or halide group, n is an integer of 2 or more, n' is an integer of 1 or more, and $R_0$, $R_1$, $R_2$, $R_3$, $R_4$ and $R_5$ may be H or a group selected from alkyl groups, aliphatic groups, cycloaliphatic groups, aromatic groups and mixtures thereof, with the provisos that at least one $R_1$ or $R_2$ group is selected from the group consisting of aliphatic groups, cycloaliphatic groups, aromatic groups, and mixtures thereof, and in substantially all structures primary carbamate group X is attached to a carbon atom having a lower degree of substitution than a carbon atom to which functional group Y is attached.

35 Claims, No Drawings

OTHER PUBLICATIONS

Walter H. Ohrbom, et al. U.S. Appl. No. 10/285,594, filed Oct. 31, 2002, pp. 1–41 and abstract.

Walter H. Ohrbom, et al. U.S. Appl. No. 10/305,284, filed Nov. 26, 2002, pp. 1–49 and abstract.

International Search Report PCT/US03/30294, International Filing Date Sep. 24, 2003.

BASF Coating AG, U.S. Appl. No. 10/182,528, Filed Jul. 22, 2002, pp. 1–40.

Marvin L. Green, et al., entitled "Low VOC carbamate functional coatings compositions for automative topcoats", Mar. 1–3, 2000, New Orleans, LA, USA.

W. Albert Noves, Jr.The Journal of the American Chemical Society, vol. LXXIII, 1951.

English Abstract for DE44 32 897, Publication date Mar. 21, 1996, Constabel Martin, et al.

American Cyanamid Co., B. Singh et al., entitled "Carbamylmethylated Melamines Novel Crosslinkers for the Coatings Industry", in Advanced Organic Coatings Science and Technology Series, 1991, vol. 13, pp. 193–207.

Paints and Coatings and Solvents, entitled Urea, Benzogunanmine, and Melamine Resins for Coatings, $2^{nd}$ Edition edited by Dieter Stoye and Werner Freitag 2001, pp. 80–86.

Shalom Sarel, et al. Organic Carbonates IV, entitled Factors Affecting Formation of Carbonates Homologous Cyclic, pp. 1873–1878, Dec. 1959.

J. Med. Chem., B. J. Ludwig, et al., entitled Carbarnate derivatives related to ,meprobarnate, vol. 12, 1969, pp. 462–472.

* cited by examiner

CURABLE COATING COMPOSITIONS WITH CARBAMATE COMPOUNDS

BACKGROUND OF THE INVENTION

Curable coating compositions such as thermoset coatings are widely used in the coatings art. They are often used for topcoats in the automotive and industrial coatings industry.

High-gloss and color-plus-clear composite coatings are particularly useful as topcoats where exceptional gloss, depth of color, distinctness of image, or special metallic effects are desired. The automotive industry has made extensive use of these coatings for automotive body panels. These coatings require an extremely high degree of clarity and a low degree of visual aberrations at the surface of the coating in order to achieve desired visual effects such as a high distinctness of image (DOI).

As a result, high-gloss and composite color-plus-clear coatings are susceptible to a phenomenon known as environmental etch. Environmental etch manifests itself as spots or marks on or in the finish of the coating that often cannot be rubbed out. It is often difficult to predict the degree of resistance to environmental etch that a high gloss or color-plus-clear composite coating will exhibit. Many coating compositions known for their durability and/or weatherability when used in exterior paints, such as high-solids enamels, do not provide the desired level of resistance to environmental etch when used in high gloss coatings and color-plus-clear composite coatings.

Many compositions have been proposed for use as the clearcoat of a color-plus-clear composite coating, such as polyurethanes, acid-epoxy systems and the like. However, many prior art systems suffer from disadvantages such as coatability problems, compatibility problems with the pigmented basecoat, solubility problems. Moreover, very few one-pack coating compositions have been found that provide satisfactory resistance to environmental etch, especially in the demanding environment of automotive coatings.

It has been found that carbamate functional polymers such as those described in U.S. Pat. No. 5,356,669 can be used to provide coating compositions which exhibit significantly improved environmental etch resistance. Carbamate functional polymers have been used to provide commercially advantageous coatings compositions, especially as clearcoats in composite color-plus-clear coatings.

Unfortunately, some carbamate functional compounds and/or polymers known in the prior art are vulnerable to instability and decomposition, especially with respect to the formation of cyclic carbonates and carbamates. This results in difficulties in manufacturing and storage.

It has also been difficult to make hydroxy functional mono-carbamate functional compounds in an efficient and cost effective manner. In particular, what is desired is a commercially feasible method of making such compounds that utilizes cost effective starting compounds such as polyols and diols.

In addition, although coating compositions containing carbamate functional polymers generally provide the performance properties currently required by the automotive industry, continuous improvement is always desired. As a result, it would be advantageous to provide improvements in solids or % nonvolatile, flexibility, scratch & mar resistance, cold crack resistance, chip resistance and/or the like. At the same time, such improvements must be achieved without any decrease in environmental etch resistance or other commercially required performance property.

It would also be desirable to provide such a technology which would be applicable for use in a wide variety of coating compositions and applications, such as primers, basecoats, clearcoats, two-component systems, anti-chip coating compositions, water borne coatings, solvent borne coatings, coatings for flexible substrates, powder coatings, solventless powder-slurry coatings, solventless liquid coatings, and the like.

Finally, it would be advantageous to provide improved etch resistant coating compositions which have an increased % NV (nonvolatile) or decreased VOC (volatile organic content) at a sprayable viscosity.

The prior art has failed to address and rectify these issues.

The preparation of monocarbamate alcohols by the ammonolysis of cyclic carbonates prepared from substituted propanediols is disclosed in *Some Anticonvulsant Agents Derived from 1,3-Propanediols*, Ludwig, B. J. and Piech, E. C.; J. Am Chem. Soc. (1951) 73 5779–81. CAN 47:3228.

U.S. Pat. No. 5,719,237, Rehfuss et al., discloses the use of carbamate functional compounds (a) having a plurality of carbamate groups prepared by a transcarbamylation reaction wherein an alcohol or hydroxylalkyl carbamate is reacted with an alkyl carbamate. The '237 patent teaches that it is desirable to avoid the inclusion of hydroxyl groups in compound (a) as such hydroxyl groups lead to the formation of vulnerable ether bridges.

U.S. Pat. No. 5,907,024, Ohrbom et al., and U.S. Pat. No. 5,945,499 disclose the use of hydroxyalkyl carbamates of the general structure

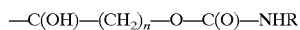

wherein n is an integer from 0 to 6 and R is H or an alkyl group of from 1 to 4 carbons.

U.S. Pat. No. 5,760,127, Bammel et al, and U.S. Pat. No. 6,262,297, Clements et al., disclose hydroxyalkylcarbamate compositions produced by the reaction of anhydrous ammonia or aqueous ammonium hydroxide with a six-membered cyclic carbonate. Bammel et al discloses that five-membered rings are preferred, not as a result of better performance, but as a result of their ease of synthesis and greater degree of commercial availability. Clements et al teaches that six-membered rings are preferred due to increased stability. However, the cost and commercial availability of the six-membered cyclic carbonates renders the process and resultant products to be less than cost effective. Also, depending on the location of any substituent groups on the starting cyclic carbonate, the process disclosed in Clements produces a reaction product which is a compound comprising a mixture of structures with varying reactivity and selectivity.

WO 0156978, Rink, et al discloses positionally isomeric diethyloctanediol dicarbamates and diethyloctanediols diallophanates. The dicarbamate and diallophanate species have no hydroxyl functionality and are made from position isomers of diethyloctane diols.

Despite these and other attempts by the prior art, the prior art has failed to provide a cost effective and efficient manner of making hydroxy functional mono-carbamate functional compounds from polyols and diols. Moreover, the prior art has particularly failed to provide such hydroxy functional mono-carbamate functional compounds that possess improved stability with respect to decomposition and the formation of undesirable cyclic carbonates and carbamates.

Accordingly, it is an object of the invention to provide curable coating compositions comprising a reactive compound that has improved reactivity, stability, and reaction selectivity.

In particular, it is an object of the invention to provide curable coating compositions which contain reactive compounds having primary carbamate functionality and either halide or hydroxy functionality and that possess improved stability with respect to the decomposition and the formation of undesirable cyclic carbonates and carbamates.

It is also an object of the invention to provide curable coating compositions which provide all of the advantages of prior art carbamate containing coating compositions, especially good environmental etch resistance, but further exhibit improvement in one or more of the following performance parameters, i.e., flexibility, scratch and mar resistance, and/or chip resistance.

It is another object of the invention to provide a technology for improving one or more of the following performance parameters, i.e., % nonvolatile solids, flexibility, scratch and mar resistance, and/or chip resistance, in a wide variety of coating compositions and applications, such as primers, basecoats, clearcoats, two-component systems, anti-chip coating compositions, water borne coatings, solvent borne coatings, coatings for flexible substrates, and the like.

Finally, it is an object of the invention to provide etch resistant coating compositions which have an increased % NV (nonvolatile) or decreased VOC (volatile organic content) at a sprayable viscosity.

SUMMARY OF THE INVENTION

These and other objects of the invention have been achieved with curable coating compositions comprising a particular reactive compound. It has unexpectedly been found that simultaneous improvements in the reactivity, stability, and reaction selectivity of reactive compounds can be achieved with the use of mono-carbamate functional and mono-hydroxy or halide functional reactive compounds of a particular formula. Moreover, it has been found that the use of this reactive compound in curable coating compositions provides improvement in one or more of the following performance parameters, i.e., flexibility, scratch and mar resistance, and/or chip resistance without sacrificing environmental etch resistance.

Indeed, it has been found that curable coating compositions comprising a reactive compound comprising one or more structures of the formula:

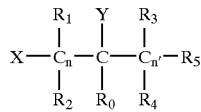

wherein X is a primary carbamate group, Y is a hydroxy group or a halide group, n is an integer of 2 or more, n' is an integer of 1 or more, and $R_0$, $R_1$, $R_2$, $R_3$, $R_4$ and $R_5$ are independently H, an alkyl group, an aromatic group, or mixtures thereof, provides unexpected advantages over the prior art. It is an aspect of the invention that (i) at least one $R_1$ or $R_2$ group is not hydrogen, and (ii) in substantially all structures, primary carbamate group X is attached to a carbon atom having a lower degree of substitution than a carbon atom to which functional group Y is attached.

DETAILS OF THE PREFERRED EMBODIMENTS

The invention provides curable coating compositions comprising (A) a binder comprising one or more active hydrogen-containing groups, (B) a curing agent having one or more groups that are reactive with the functional groups of binder (A), and a reactive compound (C) comprising a mono-carbamate functional reactive compound containing a secondary or tertiary hydroxy or halide group of a particular structure wherein the primary carbamate group and the hydroxy or halide group are separated by three or more carbon atoms. The reactive compounds of the invention possess improved stability, functional selectivity and reactivity and additionally provide improvements in one or more of the following performance parameters of the cured coating composition, i.e., flexibility, scratch and mar resistance, and/or chip resistance without sacrificing environmental etch resistance.

The curable coating composition of the present invention comprises a binder or polymer resin (A) having active hydrogen-containing functional groups. Active hydrogen-containing functional groups on polymer resins are well known in the art. Such groups include, for example, carbamate groups, hydroxyl groups, amino groups, thiol groups, hydrazide groups, activated methylene groups, and mixtures thereof. Carbamate groups, hydroxyl groups, and mixtures thereof are most preferred hydrogen-containing functional groups.

For the purposes of the instant invention, the term "polymer" refers to compounds having number average molecular weights in the range of from 1500 to over 1,000,000 Daltons, while "oligomer" refers to compounds having number average molecular weights in the range of from 200 to 1499 Daltons. The terms "binder" and "polymeric compound(s)" as used herein are meant to encompass both "polymer" and "oligomer" as defined above.

Suitable polymer resins include, for example, acrylic polymers, modified acrylic polymers, polyesters, polyepoxides, polycarbonates, polyurethanes, polyamides, polyimides, and polysiloxanes, all of which are well known in the art. Preferably, the polymer is an acrylic, modified acrylic, urethane, polyurethane, ester, or polyester. More preferably, the polymer is an acrylic polymer or a urethane or polyurethane.

In one preferred embodiment of the invention, the polymer is an acrylic. The acrylic polymer preferably has a molecular weight of 500 to 1,000,000, and more preferably of 1500 to 50,000. As used herein, "molecular weight" refers to number average molecular weight, which may be determined by the GPC method using a polystyrene standard.

Acrylic polymers are well-known in the art, and can be prepared from monomers such as methyl acrylate, acrylic acid, methacrylic acid, methyl methacrylate, butyl methacrylate, cyclohexyl methacrylate, and the like. The active hydrogen-containing functional group can be incorporated into the ester portion of the acrylic monomer through the selection of a suitable ethylenically unsaturated functional monomer. For example, hydroxy-functional acrylic monomers that can be used to form such polymers include hydroxyethyl acrylate, hydroxybutyl acrylate, hydroxybutyl methacrylate, hydroxypropyl acrylate, and the like. Amino-functional acrylic monomers would include t-butylaminoethyl methacrylate and t-butylaminoethylacrylate. Other acrylic monomers having active hydrogen functional groups in the ester portion of the monomer are also within the skill of the art.

Carbamate functional acrylics are especially preferred for use as binder (A) herein. One way to prepare such polymers is to prepare an acrylic monomer having carbamate functionality in the ester portion of the monomer. Such monomers are well known in the art and are described, for example in U.S. Pat. Nos. 3,479,328, 3,674,838, 4,126,747, 4,279,833, and 4,340,497, 5,356,669, and WO 94/10211, the disclosures of which are incorporated herein by reference. One method of synthesis involves reaction of a hydroxy ester with urea to form the carbamyloxy carboxylate (i.e., carbamate-modified acrylic). Another method of synthesis reacts an α,β-unsaturated acid ester with a hydroxy carbamate ester to form the carbamyloxy carboxylate. Yet another technique involves formation of a hydroxyalkyl carbamate by reacting a primary or secondary amine or diamine with a cyclic carbonate such as ethylene carbonate. The hydroxyl group on the hydroxyalkyl carbamate is then esterified by reaction with acrylic or methacrylic acid to form the monomer. Other methods of preparing carbamate-modified acrylic monomers are described in the art, and can be utilized as well. The acrylic monomer can then be polymerized along with other ethylenically unsaturated monomers, if desired, by techniques well known in the art.

An alternative route for preparing the polymer (A) used in the curable coating composition of the invention is to react an already-formed polymer such as an acrylic polymer with another component to form a carbamate-functional group appended to the polymer backbone, as described in U.S. Pat. No. 4,758,632, the disclosure of which is incorporated herein by reference. A different technique for preparing polymers useful as component (A) involves thermally decomposing urea (to give off ammonia and HNCO) in the presence of a hydroxy-functional acrylic polymer to form a carbamate-functional acrylic polymer. Another method involves reacting the hydroxyl group of a hydroxyalkyl carbamate with the isocyanate group of an isocyanate-functional acrylic or vinyl monomer to form the carbamate-functional acrylic. Isocyanate-functional acrylics are known in the art and are described, for example in U.S. Pat. No. 4,301,257, the disclosure of which is incorporated herein by reference. Isocyanate vinyl monomers are well known in the art and include unsaturated m-tetramethyl xylene isocyanate (sold by American Cyanamid as TMI®). Yet another technique is to react the cyclic carbonate group on a cyclic carbonate-functional acrylic with ammonia in order to form the carbamate-functional acrylic. Cyclic carbonate-functional acrylic polymers are known in the art and are described, for example, in U.S. Pat. No. 2,979,514, the disclosure of which is incorporated herein by reference. Another technique is to transcarbamylate a hydroxy-functional acrylic polymer with an alkyl carbamate. A more difficult, but feasible way of preparing the polymer would be to trans-esterify an acrylate polymer with a hydroxyalkyl carbamate.

The most preferred binder or polymer (A) will generally have a molecular weight of 2000–20,000, and preferably from 3000–6000. As used herein, molecular weight means number average molecular weight, and can be determined by the GPC method using a polystyrene standard. The carbamate content of the polymer, on a molecular weight per equivalent of carbamate functionality, will generally be between 200 and 1500, and preferably between 300 and 500. The glass transition temperature, $T_g$, of components (A) and (B) can be adjusted to achieve a cured coating having the $T_g$ for the particular application involved.

In one embodiment, the polymer component (A) can be represented by the randomly repeating units according to the following formula:

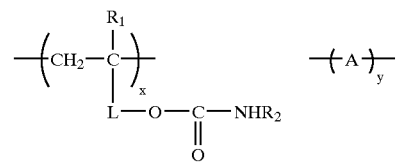

In the above formula, $R_1$ represents H or $CH_3$. $R_2$ represents H, alkyl, preferably of 1 to 6 carbon atoms, or cycloalkyl, preferably up to 6 ring carbon atoms. It is to be understood that the terms alkyl and cycloalkyl are to include substituted alkyl and cycloalkyl, such as halogen-substituted alkyl or cycloalkyl. Substituents that will have an adverse impact on the properties of the cured material, however, are to be avoided. For example, ether linkages are thought to be susceptible to hydrolysis, and should be avoided in locations that would place the ether linkage in the crosslink matrix. The values x and y represent weight percentages, with x being 10 to 90% and preferably 40 to 60%, and y being 90 to 10% and preferably 60 to 40%.

In the formula, A represents repeat units derived from one or more ethylenically unsaturated monomers. Such monomers for copolymerization with acrylic monomers are known in the art. They include alkyl esters of acrylic or methacrylic acid, e.g., ethyl acrylate, butyl acrylate, 2-ethylhexyl acrylate, butyl methacrylate, isodecyl methacrylate, hydroxyethyl methacrylate, hydroxypropyl acrylate, and the like; and vinyl monomers such as unsaturated m-tetramethyl xylene isocyanate (sold by American Cyanamid as TMI®), styrene, vinyl toluene and the like.

L represents a divalent linking group, preferably an aliphatic of 1 to 8 carbon atoms, cycloaliphatic, or aromatic linking group of 6 to 10 carbon atoms. Examples of L include

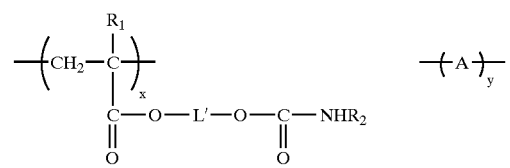

—$(CH_2)$—, —$(CH_2)_2$—, —$(CH_2)_4$—, and the like. In one preferred embodiment, -L- is represented by —COO-L'— where L' is a divalent linking group. Thus, in a preferred embodiment of the invention, the polymer component (a) is represented by randomly repeating units according to the following formula:

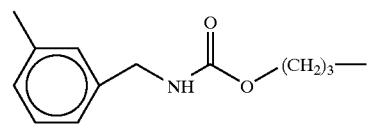

In this formula, $R_1$, $R_2$, A, x, and y are as defined above. L' may be a divalent aliphatic linking group, preferably of 1 to 8 carbon atoms, e.g., —$(CH_2)$—, —$(CH_2)_2$—, —$(CH_2)_4$—, and the like, or a divalent cycloaliphatic linking group, preferably up to 8 carbon atoms, e.g., cyclohexyl, and the like. However, other divalent linking groups can be used, depending on the technique used to prepare the polymer. For example, if a hydroxyalkyl carbamate is adducted onto an isocyanate-functional acrylic polymer, the linking group L' would include an —NHCOO— urethane linkage as a residue of the isocyanate group.

In another preferred emodiment, the binder (A) will be a particular carbamate and hydroxyl functional polymer having a number average molecular weight of from 1000 to 5000, a carbamate equivalent weight of from 300 to 600, and a Tg of from 0 to 150° C. In an especially preferred embodiment, this carbamate and hydroxy-functional polymer (A) will have a number average molecular weight of from 1500 to 3000, a carbamate equivalent weight of from 350 to 500, and a Tg of from 25 to 100° C.

This preferred carbamate and hydroxy functional polymer (A) will have from at least 66 to 100% by weight, based on the total weight of the polymer, of one or more repeat units A selected from the group consisting of

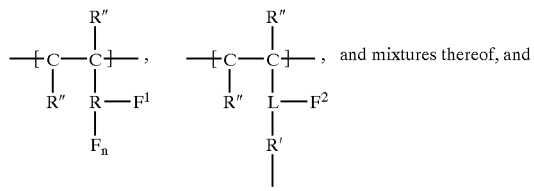

and from 0 to less than 35% by weight, based on the total weight of the polymer, of one or more repeat units A' having the structure

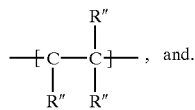

More preferably, this most preferred carbamate functional polymer (A) will have from 80 to 100 weight percent of one or more repeat units A and from 20 to 0 weight percent of one or more repeat units A', and most preferably, from 90 to 100 weight percent of one or more repeat units A and from 10 to 0 weight percent of one or more repeat units A', based on the total weight of the final carbamate functional polymer. A particularly preferred carbamate functional polymer will have more than 90 weight percent of one or more repeat units A and less than 10 weight percent, preferably between 1 and 9 weight percent, of one or more repeat units A', based on the total weight of the carbamate functional polymer.

In the above, R is an at least divalent nonfunctional linking group having from 1 to 60 carbon atoms and from 0 to 20 heteroatoms selected from the group consisting of oxygen, nitrogen, sulfur, phosphorus, and silane, and mixtures thereof. As used here, "nonfunctional" refers to the absence of groups that are reactive with crosslinking agents under traditional coating curing conditions.

Illustrative examples of suitable R groups are aliphatic or cycloaliphatic linking groups of from 1 to 60 carbons, aromatic linking groups of from 1 to 10 carbons, and mixtures thereof. Preferred R groups include aliphatic or cycloaliphatic groups of from 2 to 10 carbons. R may, and preferably will, include one or more heteroatoms via one or more divalent internal linking groups such as esters, amides, secondary carbamates, ethers, secondary ureas, ketones, and mixtures thereof. Internal linking groups selected from the group consisting of esters, secondary carbamates, and mixtures thereof, are more preferred, with esters being most preferred.

Examples of particularly preferred R groups are set forth below. Note that $F^1$ is not part of R but is shown in the structures below to provide perspective.

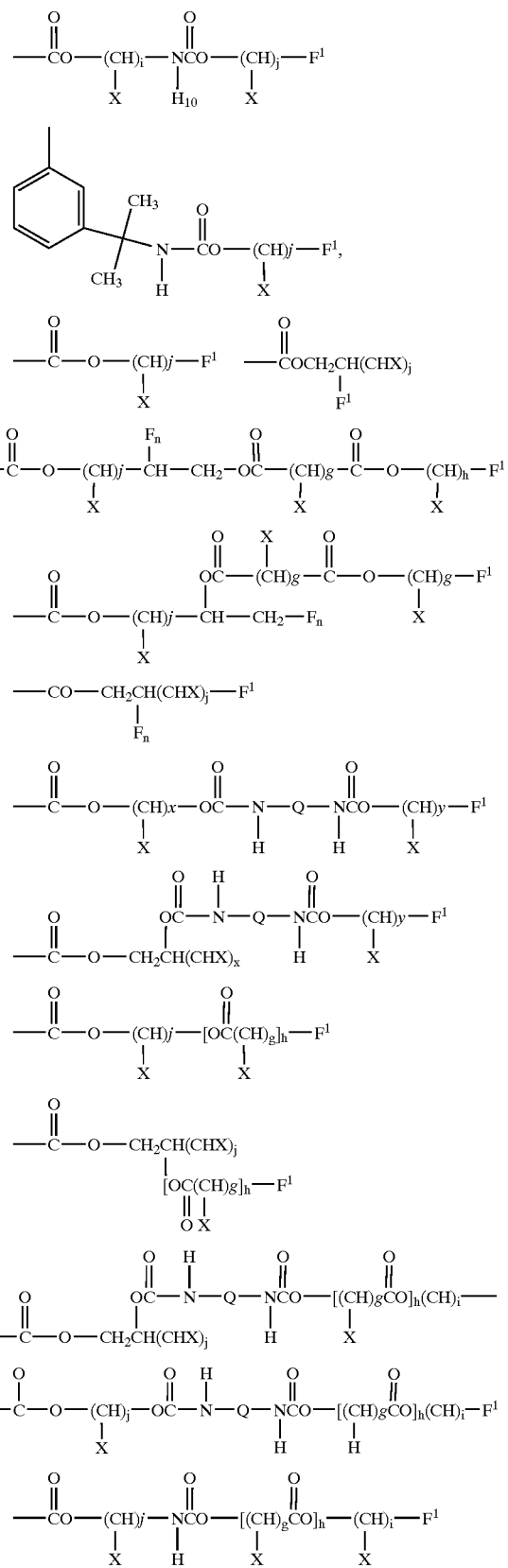

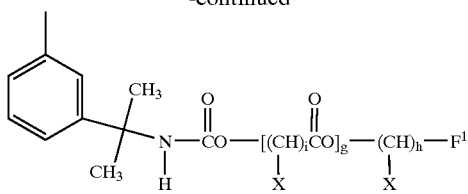

and isomers thereof, wherein X is H or is a a monovalent nonfunctional linking group having from 1 to 20 carbon atoms and from 0 to 20 heteroatoms selected from the group consisting of oxygen, nitrogen, sulfur, phosphorus, and silane, and mixtures thereof; i, j, g, and h are intergers from 0 to 8; and Q is an at least divalent nonfunctional linking group having from 1 to 60 carbon atoms and from 0 to 20 heteroatoms selected from the group consisting of oxygen, nitrogen, sulfur, phosphorus, and silane, and mixtures thereof.

A most preferred R group is

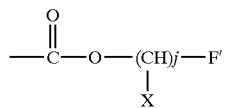

wherein j is from 1 to 6 and X is as defined above.

R' is an at least monovalent nonfunctional linking group having from 1 to 60 carbon atoms and from 0 to 20 heteroatoms selected from the group consisting of oxygen, nitrogen, sulfur, phosphorus, and silane, and mixtures thereof. As used here, "nonfunctional" refers to the absence of groups that are reactive with crosslinking agents under traditional coating curing conditions.

Illustrative examples of suitable R' groups are aliphatic or cycloaliphatic linking groups of from 1 to 60 carbons, aromatic linking groups of from 1 to 10 carbons, and mixtures thereof. Preferred R' groups include aliphatic or cycloaliphatic groups of from 2 to 10 carbons. R' may, and preferably will, include one or more heteroatoms via one or more divalent internal linking groups such as esters, amides, secondary carbamates, ethers, secondary ureas, ketones, and mixtures thereof. The use of esters as internal linking groups is most preferred.

Examples of particularly preferred R' groups are

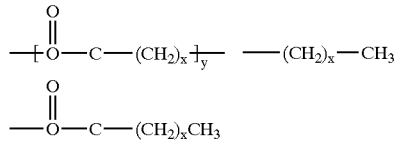

wherein x and y are from 0 to 10, preferably from 3 to 8.

In a preferred embodiment, the at least monovalent nonfunctional linking group R' will comprise at least one branched alkyl group of from 5 to 20 carbons, preferably from 5 to 15 carbons and most preferably from 8 to 12 carbons. An example of an especially suitable structure for incorporation into linking group R' is

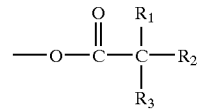

wherein $R_1$, $R_2$, and $R_3$ are alkyl groups of from 1 to 10 carbons each. Most preferably, $R_1$, $R_2$, and $R_3$ will total from 8 to 12 carbons with at least one of $R_1$, $R_2$, and $R_3$ being a methyl group. In a most preferred embodiment, n will be 0 when R' comprises this branched alkyl structure.

R" is H or a monovalent nonfunctional linking group having from 1 to 20 carbon atoms and from 0 to 20 heteroatoms selected from the group consisting of oxygen, nitrogen, sulfur, phosphorus, and silane, and mixtures thereof.

Illustrative examples of suitable R" groups are hydrogen, aliphatic or cycloaliphatic linking groups of from 1 to 60 carbons, aromatic linking groups of from 1 to 10 carbons, and mixtures thereof. R" may, and preferably will, include one or more heteroatoms via one or more divalent internal linking groups such as esters, amides, secondary carbamates, ethers, secondary ureas, ketones, and mixtures thereof Preferred R" groups are H, —$CH_3$, aromatic groups such as benzyl, and alkyl esters of from 2 to 10 carbons, especially from 4 to 8 carbons. H and methyl are most preferred as R".

L is an at least trivalent nonfunctional linking group having from 1 to 60 carbon atoms and from 0 to 20 heteroatoms selected from the group consisting of oxygen, nitrogen, sulfur, phosphorus, and silane, and mixtures thereof. As used here, "nonfunctional" refers to the absence of groups which are reactive with crosslinking agents under traditional coating curing conditions.

Illustrative examples of suitable L groups are aliphatic or cycloaliphatic linking groups of from 1 to 60 carbons, aromatic linking groups of from 1 to 10 carbons, and mixtures thereof. Preferred L groups include aliphatic or cycloaliphatic groups of from 2 to 10 carbons. L may, and preferably will, include one or more heteroatoms via one or more divalent internal linking groups such as esters, amides, secondary carbamates, ethers, secondary ureas, ketones, and mixtures thereof. Internal linking groups selected from the group consisting of esters, secondary carbamates, and mixtures thereof, are more preferred, with esters being most preferred.

An example of preferred L groups are

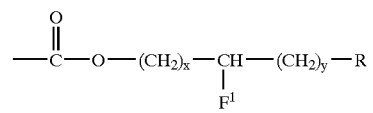

and isomers thereof, wherein $F^1$ and R are as described, x and y may the same or different and are from 0 to 10, preferably from 1 to 3, and is most preferably 1.

F, $F^1$ and $F^2$ are functional groups selected from the group consisting of primary carbamate groups, hydroxyl groups, and mixtures thereof, such as beta-hydroxy primary carbamate groups, with the proviso that at least one of $F^1$ and $F^2$ are a primary carbamate group or a beta-hydroxy primary carbamate group, and n is an integer from 0 to 3, most preferably 0.

Modified acrylics can also be used as the polymer or binder (A) in the curable coating compositions of the invention. Such acrylics may be polyester-modified acrylics or polyurethane-modified acrylics, as is well known in the art. Polyester-modified acrylics modified with ε-caprolactone are described in U.S. Pat. No. 4,546,046 of Etzell et al, the disclosure of which is incorporated herein by reference. Polyurethane-modified acrylics are also well known in the art. They are described, for example, in U.S. Pat. No. 4,584,354, the disclosure of which is incorporated herein by reference.

Polyesters having active hydrogen groups such as hydroxyl groups can also be used as the binder (A) in the curable coating composition according to the invention. Such polyesters are well known in the art, and may be prepared by the polyesterification of organic polycarboxylic acids (e.g., phthalic acid, hexahydrophthalic acid, adipic acid, maleic acid) or their anhydrides with organic polyols containing primary or secondary hydroxyl groups (e.g., ethylene glycol, butylene glycol, neopentyl glycol).

Polyurethanes having active hydrogen functional groups are also well known in the art. They are prepared by a chain extension reaction of a polyisocyanate (e.g., hexamethylene diisocyanate, isophorone diisocyanate, MDI, etc.) and a polyol (e.g., 1,6-hexanediol, 1,4-butanediol, neopentyl glycol, trimethylol propane). They can be provided with active hydrogen functional groups by capping the polyurethane chain with an excess of diol, polyamine, amino alcohol, or the like.

The curable coating compositions of the invention will further include a curing agent (B). Binder (A) is cured via reaction with a component (B) having a plurality of functional groups that are reactive with the active hydrogen-containing functional groups on binder (A). Such reactive groups include active methylol or methylalkoxy groups on aminoplast crosslinking agents or on other compounds such as phenol/formaldehyde adducts, isocyanate groups, siloxane groups, cyclic carbonate groups, and anhydride groups.

Examples of compounds suitable for use as curing agent (B) include melamine formaldehyde resin (including monomeric or polymeric melamine resin and partially or fully alkylated melamine resin), blocked or unblocked polyisocyanates (e.g., TDI, MDI, isophorone diisocyanate, hexamethylene diisocyanate, and isocyanurate trimers of these, which may be blocked for example with alcohols or oximes), urea resins (e.g., methylol ureas such as urea formaldehyde resin, alkoxy ureas such as butylated urea formaldehyde resin), polyanhydrides (e.g., polysuccinic anhydride), and polysiloxanes (e.g., trimethoxy siloxane). Aminoplast resin such as melamine formaldehyde resin or urea formaldehyde resin are especially preferred.

The reactive compounds (C) of the invention comprise one or more structures of the formula:

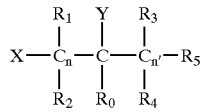

wherein X is a primary carbamate group, Y is a secondary or tertiary hydroxy or halide group, n is an integer of 2 or more, n' is an integer of 1 or more, and $R_0$, $R_1$, $R_2$, $R_3$, $R_4$ and $R_5$ may independently be H or a group selected from aliphatic groups, cycloaliphatic groups, aromatic groups, and mixtures thereof, with the provisos that at least one $R_1$ or $R_2$ group is selected from the group consisting of aliphatic groups, cycloaliphatic groups, and aromatic groups, and primary carbamate group X is attached to a carbon atom having a lower degree of substitution than a carbon atom to which functional group Y is attached.

The term "structures" as used herein refers to isomers that satisfy the requirements of the instant invention. "Isomers" as used herein refers to structural and position isomers that have the same empirical chemical formula. Structures as used herein refers to those isomers which have the same empirical chemical formula but which satisfy the requirements of the instant formula. For the purposes of the instant invention, it will be appreciated that a single compound may comprise one or more than one structure. Illustrative examples of structural isomers are 2-ethyl-1,3-hexanediol and 2-propyl-1,3-pentanediol. Illustrative examples of position isomers are 2-ethyl-1,3-hexanediol and 2-ethyl-1,4-hexanediol. Illustrative examples of isomers which are both structural and position isomers are 2-ethyl-1,3-hexanediol and 2-propyl-1,4-pentanediol. However, it will be appreciated that only those isomers that satisfy the requirements of the instant invention may be structures of the reactive compound of the invention, i.e., they must (1) be of the formula:

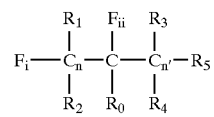

wherein X is a primary carbamate group, Y is either a hydroxy group or a halide group, n is an integer of 2 or more, n' is an integer of 1 or more, and $R_0$, $R_1$, $R_2$, $R_3$, $R_4$ and $R_5$ are independently H, an alkyl group, an aromatic group, or mixtures thereof, (2) at least one $R_1$ or $R_2$ group in this formula must not be hydrogen, and (3) most importantly, primary carbamate group X must be attached to a carbon atom having a lower degree of substitution than the carbon atom to which functional group Y is attached.

In general, the reactive compound (C) of the invention may comprise one or more structures that satisfy the above requirements. In a preferred embodiment, the reactive compound will comprise at least two structures that are isomerically different as defined above but which each satisfy the above noted requirements of the invention. In a most preferred embodiment of the invention, the reactive compound of the invention will comprise at least four structures.

As noted above, it is an aspect of the invention that primary carbamate group X be attached to a carbon atom having a lower degree of substitution than the carbon atom to which functional group Y is attached. The term "lower degree of substitution" may be understood per the following statements. If X is a primary carbamate group attached to a primary carbon atom (i.e., X—$CH_2$—), Y will be functional group attached to either a secondary carbon atom (i.e., -Cn-CH(Y)-Cn'-) or a tertiary carbon atom (i.e., -Cn-$CR_0$(Y)-Cn'- wherein $R_0$ is not hydrogen and is an alkyl or aromatic containing group as further defined herein. If X is a primary carbamate group attached to a secondary carbon atom, i.e., (X—CHR—, wherein R is either $R_1$ or $R_2$ as defined above but is not hydrogen), Y must be a functional group attached to a tertiary carbon (i.e., -Cn-$CR_0$(Y)-Cn'- wherein $R_0$ is as defined above but is not hydrogen). It can be appreciated that because primary carbamate group X must be attached to a carbon atom having at least one fewer non-hydrogen substituent than that of the carbon atom to which functional group Y is attached, at least one of the substituents $R_1$ and $R_2$ must be hydrogen for the carbon to which X is attached.

As used herein, "primary carbamate group" refers to the functional group having the structure

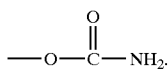

Thus, the primary carbamate group of the invention may be defined as a terminal or pendent carbamate group. In addition, it is an aspect of the method of the invention that the resultant reactive compounds will have one and only one primary carbamate group. That is, the reactive compounds produced by the instant method are limited to mono-carbamate functional compounds having at least one additional functional group that is either secondary or tertiary.

Reactive compounds made by the method of the invention will be substantially free of heteroatoms. "Heteroatoms" as used herein refers to atoms other than carbon or hydrogen. The phrase "substantially free of" as used herein means that the portion of reactive additive (c) which does not include the primary carbamate group X or the secondary or tertiary functional group Y will generally have no than two atoms which are other than carbon or hydrogen, i.e., atoms such as N, O, Si, mixtures thereof, and the like. More preferably, that portion of reactive additive (c) that does not include primary carbamate group X or tertiary or secondary functional group Y will have no more than one atom that is other than carbon or hydrogen. In a most preferred embodiment, that portion of reactive additive (C) that does not include functional groups X and Y will have no heteratoms, i.e., will consist solely of carbon and hydrogen atoms. Thus, in a most preferred aspect of the invention, the only heteroatomsin reactive additive (c) will be present in functional groups X and Y.

Functional group Y could be any group convertible to a carbamate group but may not be a carbamate group. Functional group Y will preferably be a hydroxyl group or halide groups. Hydroxyl groups are most preferred for use as functional group Y.

It will be appreciated that functional group Y is not located on a primary carbon atom in the above formula. Rather, functional group Y will be a secondary functional group when $R_0$ is H and will be a tertiary functional group when $R_0$ is an alkyl or aromatic containing group, i.e., an aliphatic group, a cycloaliphatic group, an aromatic group, or mixtures thereof. In a most preferred embodiment Y will be a secondary functional group and $R_0$ will be hydrogen.

In general, $R_0$, $R_1$, $R_2$, $R_3$, $R_4$ and $R_5$ may be H or an alkyl group, an aromatic group, or mixtures thereof Illustrative alkyl groups are aliphatic groups and cycloaliphatic groups. Suitable alkyl and aromatic containing groups will generally have from one to sixteen carbon atoms and may be linear or branched. As used herein, the term "branched" refers to both lateral branches and forked branches. Lateral refers to a branch of two small chains at the end atom of a carbon chain. Forked refers to a branch of two small chains in the middle of a carbon chain. Any individual substituent may have both branching and forking therein. In addition, it is within the scope of the invention for two or more of the various R substituents to be connected with each other.

As noted above $R_0$ may be H or an alkyl or aromatic group containing substituent. In a most preferred embodiment $R_0$ will be H so that functional group Y is a secondary functional group. If $R_0$ is not hydrogen, suitable groups are those groups selected from the group of aliphatic groups, cycloaliphatic groups, aromatic groups and mixtures thereof. Preferred for use as $R_0$ are aliphatic and cycloaliphatic groups, with aliphatic groups being most preferred for use as $R_0$. Particularly suitable groups for use as $R_0$ are aliphatic groups and cycloaliphatic groups containing from one to sixteen carbon atoms, with aliphatic groups containing one to twelve carbon atoms being preferred if $R_0$ is an alkyl group and aliphatic groups containing one to eight carbon atoms being most preferred if $R_0$ is an alkyl group. Finally, it is within the scope of the invention that $R_0$ be an alkyl or aromatic group connected to any of the other $R_{1-5}$ substituents.

$R_1$, $R_2$, $R_3$, $R_4$ and $R_5$ may be H or a group as defined above for $R_0$.

However, it is an aspect of the invention that at least one $R_1$ or $R_2$ group must be selected from the group consisting of aliphatic groups, cycloaliphatic groups, aromatic groups, and mixtures thereof. That is, at least one of the $R_1$ and $R_2$ substituent groups must be other than hydrogen so long as primary carbamate group X is attached to a carbon atom having a lower degree of substitution than the carbon atom to which functional group Y is attached. Illustrative groups suitable for use as the $R_1$ or $R_2$ group that is not hydrogen are as defined above for $R_0$. Preferred for use as $R_1$ and $R_2$ are aliphatic and cycloaliphatic groups, with aliphatic groups being most preferred for use as $R_1$ or $R_2$ if they are not hydrogen. Particularly suitable non-hydrogen groups for use as $R_1$ and $R_2$ are aliphatic groups and cycloaliphatic groups containing from one to sixteen carbon atoms, with aliphatic groups containing from one to twelve carbon atoms being preferred if $R_1$ or $R_2$ is an alkyl group and aliphatic groups containing one to eight carbon atoms being most preferred if $R_1$ or $R_2$ is an alkyl group. Finally, it is within the scope of the invention that $R_1$ or $R_2$ be an alkyl or aromatic group connected to any of the other $R_{0, 3-5}$ substituents.

As noted above, because primary carbamate group X must be attached to a carbon atom having a lower degree of substitution than the carbon atom to which functional group Y is attached, at least one of the substituents $R_1$ and $R_2$ must be hydrogen for the carbon to which X is attached. This requirement is consistent with the requirement that at least one $R_1$ or $R_2$ group must be selected from the group consisting of aliphatic groups, cycloaliphatic groups, aromatic groups and mixtures thereof. When n is 2 and $R_0$ is not hydrogen, the at least one $R_1$ or $R_2$ group that is not hydrogen may be a substituent of the carbon immediately adjacent to the carbon attached to the primary carbamate group X. That is, the carbon to which the carbamate group is attached may have a primary or secondary degree of substitution. When n is greater than 2 and $R_0$ is not hydrogen, the at least one $R_1$ or $R_2$ group that is not hydrogen may be a substituent of the carbon to which the carbamate group is attached or to any of the carbons between the carbon attached to the primary carbamate group X and the carbon attached to the functional group Y, i.e., the $C_n$ carbons.

However, it is preferred that the at least one $R_1$ or $R_2$ group which is not hydrogen be attached to a carbon not directly attached to the carbamate group X. More preferably, the at least one $R_1$ or $R_2$ group that is not hydrogen will preferably be attached to a carbon atom located in closer proximity to functional group Y rather than functional X. When n is two, it will be appreciated that the at least one $R_1$ or $R_2$ group which is not hydrogen will most preferably be attached to a carbon atom located an equal distance between the carbons to which the functional groups X and Y are attached. When n is three or greater, the at least one $R_1$ or $R_2$ group which is not hydrogen will most preferably be attached to the carbon atom which is adjacent to the carbon atom to which the functional Y is attached or be in closer proximity thereto than to the carbon atom to which functional group X is attached.

It is another aspect of the invention that n be an integer of 2 or more so that functional groups X and Y are separated by at least three carbon atoms, including the carbon atoms to which are attached the functional groups X and Y. In one preferred embodiment of the invention, n will be an integer of from 2 to 12, more preferably from 2 to 8, and most preferably from 2 to 4. In another embodiment of the invention, n will be an integer of at least 3, more preferably from 3 to 12, and most preferably from 3 to 4.

In the reactive additive (c) produced by the method of the invention, n' must be an integer of 1 or more and may not be 0. In a preferred embodiment of the invention, n' will be an integer of from 1 to 16, more preferably from 1 to 12, and most preferably n' will be an integer of from 1 to 8.

$R_3$, $R_4$ and $R_5$ are selected from the group consisting of H, $C_1$–$C_{16}$ aliphatic groups, cycloaliphatic groups, aromatic groups, and mixtures thereof. In a preferred embodiment of the invention, $R_3$, $R_4$ and $R_5$ may be selected from the group consisting of H, aliphatic groups, cycloaliphatic groups, and mixtures thereof. In a most preferred embodiment, $R_3$, $R_4$ and $R_5$ will be selected from the group consisting of H, aliphatic groups, and mixtures thereof. In one embodiment according to the invention, $R_3$, $R_4$ and $R_5$ may be connected to $C_{n'}$, $R_0$, $R_1$ or $R_2$ to form a cyclic ring.

It is another aspect of the invention that in general, it is preferred that at least one of $R_3$, $R_4$ and $R_5$ will be a group other than hydrogen when n' is greater than 1. In a preferred embodiment, at least two of $R_3$, $R_4$ and $R_5$ will be other than hydrogen, i.e., $C_1$–$C_{16}$ aliphatic groups, cycloaliphatic groups, aromatic groups, and mixtures thereof, when n' is greater than 1. In a most preferred embodiment of the invention, when n' is greater than one, at least three of $R_3$, $R_4$ and $R_5$ will be selected from the group of $C_1$–$C_{16}$ aliphatic groups, cycloaliphatic groups, aromatic groups, and mixtures thereof.

In a most preferred embodiment, the reactive compounds of the invention will be made by the method of the invention. It is a particular advantage of the method of the invention that in the resulting reaction product substantially all of the structures therein possess a primary carbamate group X attached to a carbon atom having a lower degree of substitution than the carbon atom to which functional group Y is attached. It is a particular disadvantage of prior art processes that they fail to provide such a reaction product.

As used herein, "substantially" refers to no more than 10% of the resulting monocarbamate functional reaction product has a primary carbamate group attached to a carbon atom having a degree of substitution that is equal to or higher than that of the carbon atom to which the Y functional group is attached, preferably no more than 7%, and most preferably no more than 3%. It will be appreciated that amounts of unreacted starting materials are not part of this calculation.

The method of the invention requires that the reactive compounds of the invention be made by reacting a compound (a) and a compound (b).

Compound (a) must have a functional group $F_i$ and a functional group $F_{ii}$ separated by at least three carbon atoms, wherein said functional groups $F_i$ and $F_{ii}$ are independently selected from the group consisting of functional groups convertible to primary carbamate groups, and functional group $F_i$ is attached to a carbon atom having a lower degree of substitution than a carbon atom to which functional group $F_{ii}$ is attached.

Functional groups $F_i$ and $F_{ii}$ are each independently selected from the group of functional groups convertible to primary carbamate groups. Preferred examples of functional groups $F_i$ and $F_{ii}$ convertible to primary carbamate groups are hydroxy groups and halide groups. Suitable halide groups include chloride, bromide, and iodide, with chloride being the most favored halide. Most preferably functional groups $F_i$ and $F_{ii}$ will be hydroxyl groups.

Suitable compounds (a) may include polyols, diols, polyhalides, and dihalides. However, the use of diols and dihalides as compound (a) is especially preferred as they are the most commercially available and economically feasible. Diols are most preferred for use as compound (a). Indeed, it is a particular benefit of the invention that it provides an economical and commercially feasible method of making thermally stable mono-carbamate compounds containing at least one functional group from compound (a) starting materials selected from the group consisting of dihalides and diols.

In a most preferred embodiment, compound (a) will be selected from the group of diols and dihalides of the following formula:

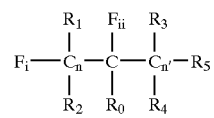

wherein $F_i$ and $F_{ii}$ are hydroxy or halide functional groups, n is an integer of 2 or more, n' is an integer of 1 or more, and $R_0$, $R_1$, $R_2$, $R_3$, $R_4$ and $R_5$ may individually be H or a group selected from the group of $C_1$–$C_{16}$ aliphatic groups, cycloaliphatic groups, aromatic groups, and mixtures thereof. However, it is an aspect of the invention that at least one $R_1$ or $R_2$ group be selected from the group consisting of $C_1$–$C_{16}$ aliphatic groups, cycloaliphatic groups, aromatic groups, and mixtures thereof. Functional group $F_i$ must be attached to a carbon atom having a lower degree of substitution than that of the carbon atom to which functional group $F_{ii}$ is attached.

Thus, it is an important aspect of the method of the invention that in compound (a), functional group $F_i$ will be attached to a carbon atom having a lower degree of substitution than the carbon atom to which functional group $F_{ii}$ is attached. For example, if $F_i$ is a primary functional group attached to a primary carbon atom (i.e., X—$CH_2$—), $F_{ii}$ will be functional group attached to either a secondary carbon atom (i.e., —$C_n$—CH(Y)—$C_{n'}$—) or a tertiary carbon atom (i.e., —$C_n$—$CR_0$(Y)—$C_{n'}$— wherein $R_0$ is not hydrogen and is as defined above). If $F_i$ is a primary functional group attached to a secondary carbon atom, i.e., (X—CHR—, wherein R is either $R_1$ or $R_2$ as defined above but is not hydrogen), $F_{ii}$ must be a functional group attached to a tertiary carbon, (i.e., —$C_n$—$CR_0$(Y)—C— wherein $R_0$ is not hydrogen and is as defined above). It can be appreciated that because functional group $F_i$ must be attached to a carbon atom having a lower degree of substitution than the carbon atom to which functional group $F_{ii}$ is attached, at least one of the substituents $R_1$ and $R_2$ on the carbon to which $F_i$ is attached must be hydrogen.

Most preferred compounds (a) will be substantially free of heteroatoms. "Heteroatoms" as used herein refers to atoms other than carbon or hydrogen. The phrase "substantially free of" as used herein means that the portion of compound (a) which does not include the functional groups $F_i$ and $F_{ii}$ will generally have no than two atoms which are other than carbon or hydrogen, i.e., atoms such as N, O, Si, mixtures thereof, and the like. More preferably, that portion of compound (a) that does not include functional groups $F_i$ and $F_{ii}$ will have no more than one atom that is other than carbon or hydrogen. In a most preferred embodiment, that portion of compound (a) that does not include functional groups $F_i$ and $F_{ii}$ will have no heteroatoms, i.e., will consist solely of carbon and hydrogen atoms. Thus, in a most preferred aspect of the invention, the only heteroatoms in compound (a) will be present in functional groups $F_i$ and $F_{ii}$.

It will be appreciated that functional group $F_{ii}$ is not located on a primary carbon atom in the above formula. Rather, functional group $F_{ii}$ will be a secondary functional group when $R_0$ is H and will be a tertiary functional group when $R_0$ is not hydrogen and is selected from the group of aliphatic groups, cycloaliphatic groups, aromatic groups, or mixtures thereof. In a most preferred embodiment $F_{ii}$ will be a secondary functional group and $R_0$ will be hydrogen.

In general, $R_0$, $R_1$, $R_2$, $R_3$, $R_4$ and $R_5$ may be H or an alkyl group, an aromatic group, or mixtures thereof. Illustrative alkyl groups are aliphatic groups and cycloaliphatic groups. Suitable alkyl and aromatic containing groups will generally have from one to sixteen carbon atoms and may be linear or branched. As used herein, the term "branched" refers to both lateral branches and forked branches. Lateral refers to a branch of two small chains at the end atom of a carbon chain. Forked refers to a branch of two small chains in the middle of a carbon chain. Any individual substituent may have both branching and forking therein. In addition, it is within the scope of the invention for two or more of the various R substituents to be connected with each other.

As noted above $R_0$ may be H or an alkyl or aromatic containing group or mixtures thereof. In a most preferred embodiment $R_0$ will be H so that functional group $F_{ii}$ is a secondary functional group. If $R_0$ is not hydrogen, suitable groups are those groups selected from the group of aliphatic groups, cycloaliphatic groups, aromatic groups and mixtures thereof. Preferred for use as $R_0$ are aliphatic and cycloaliphatic groups, with aliphatic groups being most preferred for use as $R_0$. Particularly suitable groups for use as $R_0$ are aliphatic groups and cycloaliphatic groups containing from one to sixteen carbon atoms, with aliphatic groups containing one to twelve carbon atoms being preferred if $R_0$ is an alkyl group and aliphatic groups containing one to eight carbon atoms being most preferred if $R_0$ is an alkyl group. Finally, it is within the scope of the invention that $R_0$ be an alkyl or aromatic group connected to any of the other $R_{1-5}$ substituents.

$R_1$, $R_2$, $R_3$, $R_4$ and $R_5$ may be H or a group as defined above for $R_0$.

However, it is an aspect of the invention that at least one $R_1$ or $R_2$ group must be selected from the group consisting of aliphatic groups, cycloaliphatic groups, and aromatic groups. That is, at least one of the $R_1$ and $R_2$ substituent groups must be other than hydrogen so long as functional group $F_i$ is attached to a carbon atom having a lower degree of substitution than the carbon atom to which functional group $F_{ii}$ is attached. Illustrative groups suitable for use as the $R_1$ or $R_2$ groups that are not hydrogen are those as defined above for $R_0$. Preferred for use as $R_1$ and $R_2$ are aliphatic and cycloaliphatic groups, with aliphatic groups being most preferred for use as $R_1$ or $R_2$ if they are not hydrogen. Particularly suitable non-hydrogen groups for use as $R_1$ and $R_2$ are aliphatic groups and cycloaliphatic groups containing from one to sixteen carbon atoms, with aliphatic groups containing from one to twelve carbon atoms being preferred if $R_1$ or $R_2$ is an alkyl group and aliphatic groups containing one to eight carbon atoms being most preferred if $R_1$ or $R_2$ is an alkyl group. Finally, it is within the scope of the invention that $R_1$ or $R_2$ be an alkyl or aromatic group connected to any of the other $R_{0, 3-5}$ substituents.

As noted above, because functional group $F_i$ must be attached to a carbon atom having a lower degree of substitution than the carbon atom to which functional group $F_{ii}$ is attached, at least one of the substituents $R_1$ and $R_2$ must be hydrogen for the carbon to which $F_i$ is attached. This requirement is consistent with the requirement that at least one $R_1$ or $R_2$ group must be selected from the group consisting of aliphatic groups, cycloaliphatic groups, aromatic groups and mixtures thereof. When n is 2 and $R_0$ is not hydrogen, the at least one $R_1$ or $R_2$ group that is not hydrogen may be a substituent of the carbon immediately adjacent to the carbon attached to the primary carbamate group X. That is, the carbon to which the carbamate group is attached may have a primary or secondary degree of substitution. When n is greater than 2 and $R_0$ is not hydrogen, the at least one $R_1$ or $R_2$ group that is not hydrogen may be a substituent of the carbon to which the carbamate group is attached or to any of the carbons between the carbon attached to the functional group $F_i$ and the carbon attached to the functional group $F_{ii}$, i.e., the $C_n$ carbons.

However, it is preferred that the at least one $R_1$ or $R_2$ group which is not hydrogen be attached to a carbon not directly attached to the functional group $F_i$. More preferably, the at least one $R_1$ or $R_2$ group that is not hydrogen will preferably be attached to a carbon atom located in closer proximity to functional group $F_{ii}$ rather than functional group $F_i$. When n is two, it will be appreciated that the at least one $R_1$ or $R_2$ group which is not hydrogen will most preferably be attached to a carbon atom located an equal distance between the carbons to which the functional groups $F_i$ and $F_{ii}$ are attached. When n is three or greater, the at least one $R_1$ or $R_2$ group which is not hydrogen will most preferably be attached to the carbon atom which is adjacent to the carbon atom to which the functional group $F_{ii}$ is attached or be in close proximity thereto than to the carbon atom to which the functional group $F_i$ is attached.

It is another aspect of the invention that n be an integer of 2 or more so that functional groups $F_i$ and $F_{ii}$ are separated by at least three carbon atoms, including the carbon atoms to which are attached the functional groups $F_i$ and $F_{ii}$. In one preferred embodiment of the invention, n will be an integer of from 2 to 12, more preferably from 2 to 8, and most preferably from 2 to 4. In another embodiment of the invention, n will be an integer of at least 3, more preferably from 3 to 12, and most preferably from 3 to 4.

In the most preferred compound (a) used in the method of the invention, n' must be an integer of 1 or more and may not be 0. In a preferred embodiment of the invention, n' will be an integer of from 1 to 16, more preferably from 1 to 12, and most preferably n' will be an integer of from 2 to 8.

$R_3$, $R_4$ and $R_5$ are selected from the group consisting of H, $C_1$–$C_{16}$ aliphatic groups, cycloaliphatic groups, aromatic groups, and mixtures thereof. In a preferred embodiment of the invention, $R_3$, $R_4$ and $R_5$ may be selected from the group consisting of H, aliphatic groups, cycloaliphatic groups, and mixtures thereof. In a most preferred embodiment, $R_3$, $R_4$ and $R_5$ will be selected from the group consisting of H, aliphatic groups, and mixtures thereof. In one embodiment according to the invention, $R_3$, $R_4$ and $R_5$ may be connected to $C_{n'}$, $R_0$, $R_1$ or $R_2$ to form a cyclic ring.

It is another aspect of the invention that in general, it is preferred that at least one of $R_3$, $R_4$ and $R_5$ will be a group other than hydrogen when n' is greater than 1. In a preferred embodiment, at least two of $R_3$, $R_4$ and $R_5$ will be other than hydrogen, i.e., $C_1$–$C_{16}$ aliphatic groups, cycloaliphatic groups, aromatic groups, and mixtures thereof, when n' is greater than 1. In a most preferred embodiment of the invention, when n' is greater than one, at least three of $R_3$, $R_4$ and $R_5$ will be selected from the group of $C_1$–$C_{16}$ aliphatic groups, cycloaliphatic groups, aromatic groups, and mixtures thereof.

Illustrative compounds (a) for use in a preferred embodiment of the method of the invention include 2-ethyl-1,3 hexanediol, 2-methyl-2,4-pentane diol, 2,2,4-trimethyl-1,3-pentanediol, 2,4-diethyl-1,5-octanediol, 1-hydroxymethyl cyclohexan-4-ol, and all those isomers thereof which satisfy the above requirements of the preferred formula for compound (a).

"Isomers" as used herein refers to structural and position isomers that have the same empirical chemical formula. An illustrative example of some structural isomers would be 2-ethyl-1,3-hexanediol and 2-propyl-1,3-pentanediol. An illustrative example of a position isomer would be 2-ethyl-1,3-hexanediol and 2-ethyl-1,4-hexanediol. An illustrative example of isomers which are both structural and position isomers would be 2-ethyl-1,3-hexanediol and 2propyl-1,4-pentanediol. However, it will be appreciated that only those isomers that satisfy the requirements of the instant invention are suitable, i.e., they must (1) be of the formula:

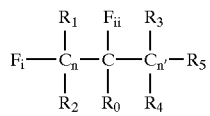

wherein $F_i$ and $F_{ii}$ are either hydroxy groups or halide groups, n is an integer of 2 or more, n' is an integer of 1 or more, and $R_0$, $R_1$, $R_2$, $R_3$, $R_4$ and $R_5$ are independently H, an alkyl group, an aromatic group, or mixtures thereof, (2) at least one $R_1$ or $R_2$ group in this formula must not be hydrogen, and (3) most importantly, functional group $F_i$ must be attached to a carbon atom having a lower degree of substitution than the carbon atom to which functional group $F_{ii}$ is attached.

In one preferred embodiment, compound (a) will be selected from those members of the preferred formula for compound (a) that possess a particularly preferred isomeric distribution. 'Isomeric distribution' as used herein refers to the number of individual isomers that make up the material. A particularly preferred isomeric distribution is one in which compound (a) is a mixture of isomers having at least 4 or more individual isomers or structures. The resulting products made according to the invention from these materials have a greater tendency of being non-crystalline in nature. This is of advantage for obtaining low VOC coatings.

However, it will be appreciated that even compounds (a) consisting of one structure or isomer will provide acceptable levels of performance with respect to low VOC coatings. While not wishing to be bound to a particular theory, it is believed that this is attributable to the low degree of symmetry found in particular compounds (a) and thus in the final reactive compounds of the invention.

It will be appreciated that the selection of compound (b) is somewhat dependent upon the selection of functional groups $F_i$ and $F_{ii}$ of compound (a). In general, if functional group (i) is a hydroxyl group, it will be converted into a primary carbamate by reaction with a compound (b) selected from the group consisting of alkyl carbamates, cycloalkyl carbamates, ether carbamates, beta hydroxy alkyl carbamates, aryl carbamates, cyanic acid produced, for example, by the decomposition of urea, and phosgene followed by reaction with ammonia. If functional group (i) is a halide group, it may be converted into a primary carbamate group by reaction with a metal carbamate such as silver carbamate as discussed in P. Adams & F. Baron, "Esters of Carbamic Acid", Chemical Review, v. 65, 1965. In a preferred embodiment, compound (b) will be selected from the group of alkyl carbamates, cycloalkyl carbamates, ether carbamates and aryl carbamates, and mixtures thereof, with alkyl carbamates being most preferred as compound (b).

Illustrative aikyl carbamates, cycloalkyl carbamates, and aryl carbamates include methyl carbamate, propyl carbamate, n-butyl carbamate, cyclohexyl carbamate, t-butyl carbamate, isopropyl carbamate, and phenyl carbamate. An example of a hydroxyalkyl carbamate is hydroxyethyl carbamate. An example of an ether carbamate is 2-methoxyethyl carbamate. It will be appreciated that when (b) is selected from these compounds, reaction with suitable compounds (a) results in alcohols, phenols, ether alcohols and related materials as by-products. Examples of most preferred alkyl carbamates for use as compound (b) include methyl carbamate, isopropyl carbamate and n-butyl carbamate.

Compound (a) and compound (b) are reacted under conditions intended to minimize the formation of functional group $F_{ii}$ to a carbamate group. In general, compounds (a) and (b) will reacted under conditions such that no more than 10% of the functional group (ii) is converted to a carbamate group, based on the starting amount of compound (a). More preferably, compounds (a) and (b) will be reacted under conditions such that no more than 5% of functional group $F_{ii}$ is converted to a carbamate group, and most preferably no more than 4% of functional group (ii) will be converted to a carbamate group, all based on the starting amount of compound (a).

Thus, the formation of dicarbamate species is highly disfavored in the method of the invention. One technique to disfavor the formation of the dicarbamate is to use a deficit amount of compound (b), that is, the equivalent of the functional groups of compound (b) is less than the equivalent amount of functional group $F_i$ based on the starting amount of compound (a). In this case, the equivalent amount of compound (b) used in relationship to functional group $F_i$ can range from 0.99:1 to 0.25:1. An alternative technique that can be used to disfavor the formation of the dicarbamate when one or more than one equivalent of compound (b) are used in comparison to functional group $F_i$ on compound (a) is to stop the reaction before all of functional $F_i$ is converted to a primary carbamate. This second technique works best for reaction conditions that have a high degree of selectivity such as transcarbamation reactions. In comparison, this technique would be disfavored in a more nonselective reaction such as that between a hydroxy group and cyanic acid.

While not wishing to be bound to a particular theory, it is believed that the effectiveness of these two approaches can be increased by increasing the relative degree of steric hindrance surrounding functional groups $F_i$ and $F_{ii}$ on compound (a). That is, in general, dicarbamate formation can be diminished if the degree of steric hindrance surrounding functional group $F_{ii}$ is greater than the degree of steric hindrance on functional group $F_i$. This relationship is believed to hold true regardless of the method of reaction selected.

If not all of functional group $F_i$ has been transformed into a primary carbamate, the excess amount of unreacted starting material (a) can be removed by known techniques, such as vacuum distillation, extraction or filtration or may be left in as discussed below.

In some cases, the presence of unreacted (a) in the reactive compound (C) may be desirable in the curable coating compositions of the invention. If left in the curable coating compositions of the invention, the presence of unreacted (a) can act as a solvent, a reactive diluent or both. Alternatively, any excess amount of unreacted (a) may first be removed as described above.

It is an aspect of the present invention that at least one or both of components (A) and (B) have at least one group thereon that is reactive with one or both of functional groups X and Y of reactive compound (C). In a preferred embodiment, the curing agent (B) will react with one or both of functional groups X and Y of reactive compound (C) and will be used in such an amount that reaction can proceed with both binder (A) and reactive compound (C). This may be accomplished through the selection of an aminoplast as component (B). Depending on the cure conditions, other compounds identified above as component (B) may also be reactive with one or both of functional groups X and Y of reactive compound (C). For example, in one preferred embodiment, curing agent (B) will comprise a mixture of curing agents (B) such as a mixture of an aminoplast and an isocyanate functional material. Alternatively, binder (A) may contain groups that are reactive with carbamate, such as an acrylic polymer containing isobutoxymethyl acrylamide groups.

A solvent may optionally be utilized in the curable coating compositions of the present invention. Although the composition used according to the present invention may be utilized, for example, in the form of substantially solid powder, or a dispersion, it is often desirable that the composition is in a substantially liquid state, which can be accomplished with the use of a solvent. This solvent should act as a solvent with respect to binder (A), curing agent (B), and reactive compound (C). In general, depending on the solubility characteristics of components (A), (B), and (C), the solvent can be any organic solvent and/or water. In one preferred embodiment, the solvent is a polar organic solvent. More preferably, the solvent is a polar aliphatic solvents or polar aromatic solvents. Still more preferably, the solvent is a ketone, ester, acetate, aprotic amide, aprotic sulfoxide, or aprotic amine. Examples of useful solvents include methyl ethyl ketone, methyl isobutyl ketone, m-amyl acetate, ethylene glycol butyl etheracetate, propylene glycol monomethyl ether acetate, xylene, N-methylpyrrolidone, or blends of aromatic hydrocarbons. In another preferred embodiment, the solvent is water or a mixture of water with small amounts of co-solvents.

Depending on the make up of the rest of the paint composition, it is also possible to have a liquid paint that has low levels of additional solvents wherein the reactive compound (C) functions as a reactive diluent. In a most preferred case, no solvent other than compound (C) will be present component (C). It will be appreciated that this provides an essentially zero VOC coating since the compound (C) will ultimately enter into the film-forming reaction.

The curable coating compositionse of the invention may include a catalyst to enhance the cure reaction. For example, when aminoplast compounds, especially monomeric melamines, are used as curing agent (B), a strong acid catalyst may be utilized to enhance the cure reaction. Such catalysts are well-known in the art and include, for example, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Strong acid catalysts are often blocked, e.g. with an amine. Other catalysts that may be useful in the composition of the invention include Lewis acids, zinc salts, and tin salts.

In a preferred embodiment of the invention, the solvent is present in the coating composition in an amount of from about 0.00 weight percent to about 99 weight percent, preferably from about 10 weight percent to about 60 weight percent, and more preferably from about 30 weight percent to about 50 weight percent.

Any additional agent used, for example, surfactants, fillers, stabilizers, wetting agents, dispersing agents, adhesion promoters, UV absorbers, HALS, etc. may be incorporated into the coating composition of the invention. While the agents are well-known in the prior art, the amount used must be controlled to avoid adversely affecting the coating characteristics.

The curable coating compositions of the invention may be used in a wide variety of applications, such as primers, basecoats, clearcoats, two-component systems, anti-chip coating compositions, water borne coatings, solvent borne coatings, coatings for flexible substrates, solventless coatings, powder coatings, and the like. In a preferred embodiment, the curable coating compositions of the invention are preferably utilized in a high-gloss coating and/or as the clearcoat of a composite color-plus-clear coating. High-gloss coatings as used herein are coatings having a 20° gloss (ASTM D523-89) or a DOI (ASTM E430-91) of at least 80.

When the coating composition of the invention is used as a high-gloss pigmented paint coating, the pigment may be any organic or inorganic compounds or colored materials, fillers, metallic or other inorganic flake materials such mica or aluminum flake, and other materials of kind that the art normally names as pigments. Pigments are usually used in the composition in an amount of 1% to 100%, based on the total solid weight of components A, B and C (i.e., a P:B ratio of 0.1:1.0).

When the coating composition according to the invention is used as the clearcoat of a composite color-plus-clear coating, the pigmented basecoat composition may any of a number of types well-known in the art, and does not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. In one preferred embodiment of the invention, the basecoat composition also utilizes a carbamate-functional acrylic polymer. Basecoat polymers may be thermoplastic, but are are preferably crosslinkable and comprise one or more type of cross-linkable functional groups. Such groups include, for example, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Useful cross-linkable functional groups include hydroxy, epoxy, acid, anhydride, silane, and acetoacetate groups. Preferred cross-linkable functional groups include hydroxy functional groups and amino functional groups.

Basecoat polymers may be thermoplastic, self-crosslinkable, or may require a separate cross-linking agent that is reactive with the functional groups of the polymer. When the polymer comprises hydroxy functional groups, for example, the cross-linking agent may be an aminoplast resin, isocyanate and blocked isocyanates (including isocyanurates), and acid or anhydride functional cross-linking agents.

Coating compositions of the invention can be coated on an article or surface by any of a number of techniques well-known in the art. These include, for example, spray coating, dip coating, roll coating, curtain coating, and the like. For automotive body panels, spray coating is preferred.

The coating compositions described herein are preferably subjected to conditions so as to cure the coating layers. Although various methods of curing may be used, heat-curing is preferred. Generally, heat curing is effected by exposing the coated article to elevated temperatures provided primarily by radiative heat sources. Curing temperatures will vary depending on the particular blocking groups used in the cross-linking agents, however they generally range between 93° C. and 177° C. The compounds (C) according to the present invention are reactive even at relatively low cure temperatures. Thus, in a preferred embodiment, the cure temperature is preferably between 115° C. and 150° C., and more preferably at temperatures between 115° C. and 138° C. for a blocked acid catalyzed system. For an unblocked acid catalyzed system, the cure temperature is preferably between 82° C. and 99° C. The curing time will vary depending on the particular components used, and physical parameters such as the thickness of the layers, however, typical curing times range from 15 to 60 minutes, and preferably 15–25 minutes for blocked acid catalyzed systems and 10–20 minutes for unblocked acid catalyzed systems.

The invention is further described in the following examples. All parts and percentages are by weight unless otherwise specified.

EXAMPLES

Example 1

Preparation of the Reactive Compound (C) by the Method of the Invention

A mixture of 55.69 parts of 2-ethyl-1,3-hexanediol, 20.94 parts of methyl carbamate, 23.26 parts of toluene and 0.07 parts of dibutyl tin oxide were heated under an inert atmosphere to reflux in a reactor equipped with an extractor that can remove methanol but returns toluene to the reaction mixture. Once at reflux, the inert atmosphere was turned off. An additional 0.04 parts of dibutyl tin oxide was added after the first three hours at reflux. Additional toluene was added to the reaction mixture to keep the reflux temperature below 130° C. The reaction was stopped when ~85% of the theoretical amount of hydroxy groups were converted into carbamate groups. Free methyl carbamate, toluene and some of the unconverted 2-ethyl-1,3-hexanediol was then removed by vacuum distillation. The final product was a mixture of 55.5% 2-ethyl-1,3-hexanediol, 42.3% 3-hydroxy-2-ethyl carbamate and 2.2% 2-ethylhexane1,3-dicarbamate.

Example 2

Preparation of the Reactive Compound (C) by the Method of the Invention

A mixture of 45.52 parts of 2-ethyl-1,3-hexanediol, 23.4 parts of methyl carbamate, 0.08 parts butyltin hydroxide oxide and 30.4 parts toluene was headed heated under an inert atmosphere to reflux in a reactor equipped with an extractor that can remove methanol but return toluene to the reaction mixture. Once at reflux, the inert atmosphere was turned off. The reaction was stopped when approximately half of the theoretical amount of mono-carbamate product was formed. Then 0.6 parts of octanethiol was added and the reaction mixture was held at 100° C. for 1.5 hours. Free methyl carbamate, toluene, octanethiol and some of the unconverted 2-ethyl-1,3-hexanediol was then removed by vacuum distillation. The final product was a mixture of 43.0% 2-ethyl-1,3-hexanediol and 53.2% 3-hydroxy-2-ethylhexane carbamate and 3.7% 2-ethyl-1,3-hexane dicarbamate.

Example 3

Prophetic Preparation of a Curable Coating Composition of the Invention

The following materials would be added in order to a stainless steel one-quart container and subsequently placed under medium agitation (a mixing blade) for approximately fifteen to twenty minutes. The resulting clear coating composition would have a theoretical % NV of 57.0%.

| Raw material component | Amount (grams) |
|---|---|
| Reactive compound (C) from Ex. 1 | 335.70 |
| Carbamate functional resin[1] | 116.00 |
| Curing agent (B)[2] | 141.87 |
| Catalyst[3] | 10.55 |
| UVA | 10.55 |
| HALS | 2.11 |
| Flow additive[4] | 2.93 |
| Rheology control agent[5] | 36.62 |
| n-butyl acetate | 93.62 |
| n-butanol | 17.58 |

[1]50% NV Carbamate functional resin per the examples of U.S. Pat. No. 5,512,639
[2]Fully methylated monomeric aminoplast
[3]25% blocked DDBSA in methanol
[4]polysiloxane flow additive
[5]9.6% fumed silica ground in a 65% NV carbamate functional acrylic resin per U.S. Pat. No. 6,423,788

What is claimed is:

1. A curable coating composition comprising
   (A) a binder comprising one or more active hydrogen containing functional groups,
   (B) a curing agent comprising one or more functional groups reactive with the functional groups of binder (A), and
   (C) a reactive compound comprising one or more structures of the formula:

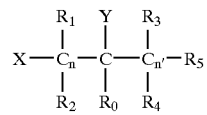

wherein
   X is a primary carbamate group,
   Y is a hydroxy group or a halide group,
   n is an integer of 2 or more,
   n' is an integer of 1 or more, and
   $R_0$, $R_1$, $R_2$, $R_3$, $R_4$ and $R_5$ are independently H, an alkyl group, an aromatic group, or mixtures thereof,
with the provisos that
   (i) at least one $R_1$ or $R_2$ group is not hydrogen, and
   (ii) in substantially all structures, primary carbamate group X is attached to a carbon atom having a lower degree of substitution than a carbon atom to which functional group Y is attached.

2. The curable coating composition of claim 1 wherein reactive compound (C) comprises one structure.

3. The curable coating composition of claim 2 wherein reactive compound (C) comprises at least two structures.

4. The curable coating composition of claim 1 wherein reactive compound (C) comprises at least four structures.

5. The curable coating composition of claim 1 wherein Y is a hydroxy group.

6. The reactive compound of claim 1 wherein n is an integer of from 2 to 12.

7. The curable coating composition of claim 6 wherein n is an integer of from 2 to 8.

8. The curable coating composition of claim 7 wherein n is an integer of from 2 to 4.

9. The curable coating composition of claim 1 wherein n is an integer of at least 3.

10. The curable coating composition of claim 9 wherein n is an integer of from 3 to 12.

11. The curable coating composition of claim 10 wherein n is an integer of from 3 to 4.

12. The curable coating composition of claim 1 wherein n' is an integer of from 1 to 16.

13. The curable coating composition of claim 12 wherein n' is 1 to 12.

14. The curable coating composition of claim 13 wherein n' is 1 to 8.

15. The curable coating composition of claim 1 wherein at least one of the substituents $R_1$ and $R_2$ on the carbon to which X is attached is hydrogen.

16. The curable coating composition of claim 15 wherein both of the substituents $R_1$ and $R_2$ on the carbon to which X is attached are hydrogen.

17. The curable coating composition of claim 16 wherein $R_0$ is H.

18. The curable coating composition of claim 16 wherein $R_0$ is not hydrogen.

19. The curable coating composition of claim 17 wherein $R_0$ is selected from the group consisting of $C_1$–$C_{16}$ aliphatic groups, $C_1$–$C_{16}$ cycloaliphatic groups, $C_1$–$C_{16}$ aromatic groups, and mixtures thereof.

20. The curable coating composition of claim 19 wherein $R_0$ is selected from the group consisting of $C_1$–$C_{12}$ aliphatic groups.

21. The curable coating composition of claim 20 wherein $R_0$ is selected from the group consisting of $C_1$–$C_8$ aliphatic groups.

22. The curable coating composition of claim 15 wherein at least one of the substituents $R_1$ and $R_2$ on the carbon to which X is attached is not hydrogen and $R_0$ is not hydrogen.

23. The curable coating composition of claim 22 wherein at least one of the $R_1$ or $R_2$ groups on the carbon to which X is attached is selected from the group consisting of $C_1$–$C_{16}$ aliphatic groups, $C_1$–$C_{16}$ cycloaliphatic groups, $C_1$–$C_{16}$ aromatic groups and mixtures thereof.

24. The curable coating composition of claim 22 wherein $R_0$ is selected from the group consisting of $C_1$–$C_{16}$ aliphatic groups, $C_1$–$C_{16}$ cycloaliphatic groups, $C_1$–$C_{16}$ aromatic groups, and mixtures thereof.

25. The curable coating composition of claim 24 wherein $R_0$ is selected from the group consisting of $C_1$–$C_{12}$ aliphatic groups.

26. The curable coating composition of claim 25 wherein $R_0$ is selected from the group consisting of $C_1$–$C_8$ aliphatic groups.

27. The curable coating composition of claim 1 wherein the at least one $R_1$ or $R_2$ group that is not hydrogen is attached to a carbon atom located in closer proximity to the carbon atom to which functional group Y is attached than to the carbon atom to which functional group X is attached.

28. The curable coating composition of claim 27 wherein n is 2 and the at least one $R_1$ or $R_2$ group that is not hydrogen is attached to a carbon atom located an equal distance between the carbon atom to which functional group Y is attached and the carbon atom to which functional group X is attached.

29. The curable coating composition of claim 27 wherein n is 3 or greater and the at least one $R_1$ or $R_2$ group that is not hydrogen is attached to a carbon atom located in closer proximity to the carbon atom to which functional group Y is attached than to the carbon atom to which functional group X is attached.

30. The curable coating composition of claim 29 wherein n is 3 or greater and the at least one $R_1$ or $R_2$ group that is not hydrogen is attached to a carbon atom which is adjacent to the carbon atom to which functional group Y is attached.

31. The curable coating composition of claim 1 wherein $R_3$, $R_4$ and $R_5$ are selected from the group consisting of H, $C_1$–$C_{16}$ aliphatic groups, $C_1$–$C_{16}$ cycloaliphatic groups, $C_1$–$C_{16}$ aromatic groups, and mixtures thereof.

32. The curable coating composition of claim 1 wherein n' is greater than 1 and at least one of $R_3$, $R_4$ and $R_5$ are selected from the group consisting of $C_1$–$C_{16}$ aliphatic groups, $C_1$–$C_{16}$ cycloaliphatic groups, $C_1$–$C_{16}$ aromatic groups, and mixtures thereof.

33. The curable coating composition of claim 32 wherein at least two of $R_3$, $R_4$ and $R_5$ are selected from the group consisting of $C_1$–$C_{16}$ aliphatic groups, $C_1$–$C_{16}$ cycloaliphatic groups, $C_1$–$C_{16}$ aromatic groups, and mixtures thereof.

34. The curable coating composition of claim 33 wherein at least three of $R_3$, $R_4$ and $R_5$ are selected from the group consisting of $C_1$–$C_{16}$ aliphatic groups, $C_1$–$C_{16}$ cycloaliphatic groups, $C_1$–$C_{16}$ aromatic groups, and mixtures thereof.

35. A curable coating composition comprising
(A) a binder comprising one or more active hydrogen containing functional groups,
(B) a curing agent comprising one or more functional groups reactive with the functional groups of binder (A), and
(C) a reactive compound of the formula:

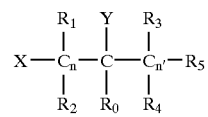

wherein
X is a primary carbamate group,
Y is a hydroxy or halide group,
n is an integer of 2 or more,
n' is an integer of 1 or more, and
$R_0$, $R_1$, $R_2$, $R_3$, $R_4$ and $R_5$ may be H or alkyl group,
with the provisos that
(i) at least one of the $R_1$ or $R_2$ groups is not hydrogen, and
(ii) primary carbamate group X is attached to a carbon atom having a lower degree of substitution than a carbon atom to which functional group Y is attached,
wherein the reactive additive is produced by a method comprising:
providing a compound (a) having a functional group $F_i$ and a functional group $F_{ii}$ separated by at least three carbon atoms, wherein:
(1.) said functional groups $F_i$ and $F_{ii}$ are hydroxy or halide groups, and
(2.) functional group $F_i$ is attached to a carbon atom having a lower degree of substitution than a carbon atom to which functional group $F_{ii}$ is attached
providing one or more compounds (b) having at least one functional group (iii) reactive with functional group $F_{ii}$ to produce a primary carbamate group, and
reacting compound (a) with a compound (b) to produce the reactive compound.

* * * * *